(12) United States Patent
Baker et al.

(10) Patent No.: US 11,544,054 B2
(45) Date of Patent: Jan. 3, 2023

(54) DETERMINATION OF API CHANGES

(71) Applicant: Wind River Systems, Inc., Alameda, CA (US)

(72) Inventors: Arlen Baker, Alameda, CA (US); Matt Jones, Portland, OR (US)

(73) Assignee: WIND RIVER SYSTEMS, INC.

( * ) Notice: Subject to any disclaimer, the term of this patent is extended or adjusted under 35 U.S.C. 154(b) by 101 days.

(21) Appl. No.: 17/301,017

(22) Filed: Mar. 22, 2021

(65) Prior Publication Data

US 2022/0300279 A1    Sep. 22, 2022

(51) Int. Cl.
*G06F 8/71* (2018.01)
*G06F 8/41* (2018.01)
*G06F 11/36* (2006.01)
*G06F 9/54* (2006.01)

(52) U.S. Cl.
CPC .............. *G06F 8/71* (2013.01); *G06F 8/41* (2013.01); *G06F 9/541* (2013.01); *G06F 11/3688* (2013.01)

(58) Field of Classification Search
CPC ... G06F 8/71; G06F 8/41; G06F 9/541; G06F 11/3688
See application file for complete search history.

(56) References Cited

U.S. PATENT DOCUMENTS

| | | | |
|---|---|---|---|
| 9,122,556 B2* | 9/2015 | Mahajan | G06F 8/43 |
| 10,908,971 B1* | 2/2021 | Gonzalez | G06F 8/41 |
| 2019/0179633 A1* | 6/2019 | Agarwal | G06F 8/71 |
| 2019/0384650 A1* | 12/2019 | Danielsson | G06F 11/3608 |
| 2020/0050446 A1* | 2/2020 | Li | G06F 8/658 |
| 2020/0097338 A1* | 3/2020 | Dhondse | G06N 3/084 |
| 2021/0112088 A1* | 4/2021 | Ramasamy | G06F 9/541 |
| 2021/0240500 A1* | 8/2021 | Clark | G06F 8/77 |
| 2021/0406383 A1* | 12/2021 | Ahuja | G06F 21/577 |
| 2022/0156133 A1* | 5/2022 | Xu | H04W 48/08 |

OTHER PUBLICATIONS

Lee, "Automatic Detection and Update Suggestion for Outdated API Names in Documentation", 2019, IEEE (Year: 2019).*

* cited by examiner

*Primary Examiner* — Hossain M Morshed
(74) *Attorney, Agent, or Firm* — Fay Kaplun & Marcin, LLP

(57) ABSTRACT

Application Programming Interfaces (APIs) for a computer program can be verified to be correct. The verification includes receiving updated source code for an application, receiving an application programming interface (API) corresponding to the application, scanning the updated source code, determining if the API has changed from a previous version of the API and determining if a change in the API is an intended change based on a comparison of the API with a predetermined benchmark.

20 Claims, 2 Drawing Sheets

DETERMINATION OF API CHANGES

BACKGROUND INFORMATION

Source code may represent the fundamental component of a program, an application, etc. An application programming interface (API) is an interface that provides information as to how to interact with a particular software application. For example, the API may define data formats for the software application, the types of calls that can be made to the software application, etc. When the source code of an application is changed, it may result in a change to the API used to interact with the application. However, in other cases, the source code changes would have no effect on the API.

SUMMARY

Some exemplary embodiments are related to a method including receiving updated source code for an application, receiving an application programming interface (API) corresponding to the application, scanning the updated source code, determining if the API has changed from a previous version of the API and determining if a change in the API is an intended change based on a comparison of the API with a predetermined benchmark.

Other exemplary embodiments are related to a system having a source code server configured to compile an updated source code for an application, the application corresponding to an application programming interface (API) and an API analysis server. The API analysis server is configured to receive the updated source code, receive the API, scan the updated source code, determine if the API has changed from a previous version of the API and determine if a change in the API is an intended change based on a comparison of the API with a predetermined benchmark.

Still further exemplary embodiments are related to an analysis server configured to perform operations. The operations include receiving updated source code for an application, receiving an application programming interface (API) corresponding to the application, scanning the updated source code, determining if the API has changed from a previous version of the API and determining if a change in the API is an intended change based on a comparison of the API with a predetermined benchmark.

DETAILED DESCRIPTION

Figure 1:
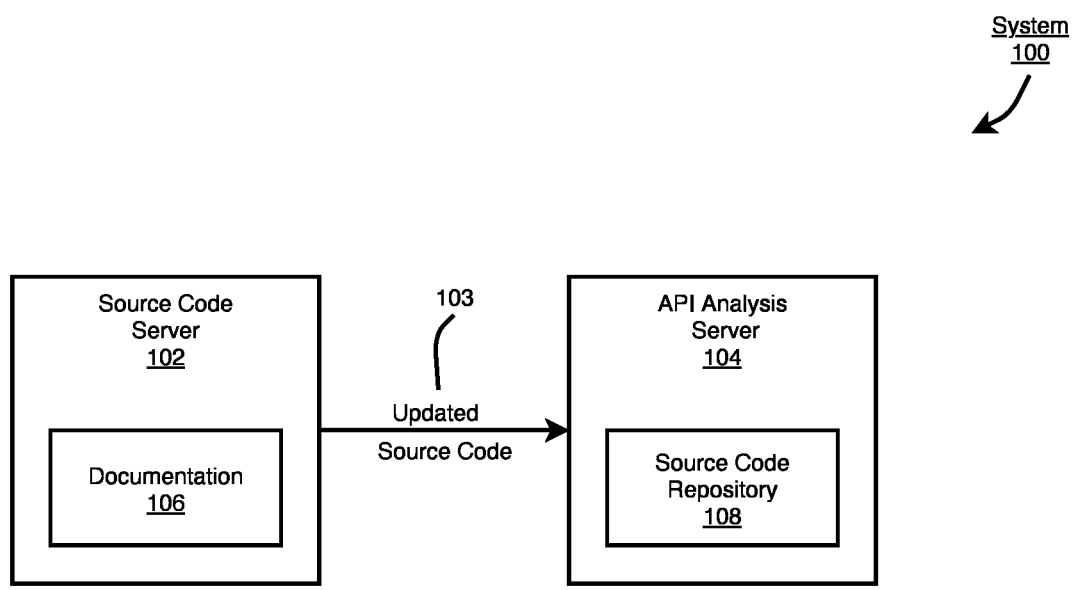
FIG. 1 shows an exemplary system used to determine the existence of a change in an application programming interface (API) according to the exemplary embodiments.

The exemplary embodiments may be further understood with reference to the following description and the related appended drawings, wherein like elements are provided with the same reference numerals. The exemplary embodiments are related to a device, a system, and a method for determining the existence of a change in an application programming interface (API) and an API analysis server that determines whether such a change, if any, is an intended change. The exemplary embodiments may scan new source code associated with an update to be released and compare the new (updated) source code with documentation associated with the update and/or a previous version of the source code. Based on the comparison(s), the exemplary embodiments determine whether a change has been made to the API and, if so, whether that change is an intended change.

The exemplary embodiments are described with regard to changing the source code and determining if any changes to the API resulting from the source code change(s) is intended. However, the particular components and inputs/outputs described with respect to the exemplary embodiments are only illustrative and variations to the components, inputs, and/or outputs may be used within the scope of the exemplary embodiments. For example, the determination of whether a change is intended may be made with respect to any other aspect of the source code. In addition, it should be understood that the source code may be source code for any software application, application, program, function, etc., and these terms may be used interchangeably throughout this document.

When changes to the source code are made, the API may or may not change. When the change in the source code results in a change to the API, this change may be an unintended result of the change to the source code. As a result, any existing tests (e.g., software quality assurance tests) that are run on the API would not be sufficient since these tests are based on the original API (and not the unintentionally modified API). Because a software company may have thousands (or more) software packages, some or all of which may be updated on a weekly or monthly basis, it would be impossible for developers to manually monitor all of these changes.

The exemplary embodiments provide a mechanism to scan the updated source code and compare it with a benchmark to determine if there are any changes to the API and whether such changes are intended changes. In some embodiments, the benchmark may include documentation indicating the changes made in the updated source code and/or one or more previous versions of the source code. If an unintended change to the API is found, an alert may be generated. As a result, the time required by developers to monitor any changes is significantly reduced since developers may now focus on unintended changes instead of monitoring every updated source code instance/package.

FIG. 1 shows an exemplary system 100 used to determine the existence of a change in an application programming interface (API) according to the exemplary embodiments. The system 100 may represent an environment in which updates to source code are made and the API associated with the updated source code is checked against a benchmark to determine if any unintended changes to the API have occurred. The system 100 may include a source code server 102, an API analysis server 104, and a source code repository 108.

The exemplary embodiments are described with regard to a system 100 including servers as separate components that individually perform respective operations with inputs and outputs being exchanged between one another (e.g., via direct communication pathways, via a wired and/or wireless network, etc.). However, this configuration of separate servers having a communication functionality is only exemplary. According to other exemplary embodiments, one or more of the functions described as being performed by the servers of the system 100 may be represented in a single processing device or a single function may be distributed to multiple processors in one or more devices. The servers of the system 100 may therefore represent the operations that are performed within the device. The servers may also represent modular components that provide further functionalities when incorporated with a main processing device (e.g., the API analysis server 104 may be implemented as the main processing device with the source code server 102 and the source code repository 108 being modular components that interact with the API analysis server 104). In further exemplary embodiments, the system 100 may be represented in a cloud or with virtual machines. When implemented in a cloud or with virtual machines, the functionalities described for the servers 102 and 104 of the system 100 may be instructions that may cause other components or other devices to perform corresponding operations.

The source code server 102 may be configured to compile an updated source code 103 and send it to the API analysis server 104. The source code may be a fundamental component from which a computer program is created. For example, the source code may be computer code (e.g., using any programming language, script language, etc.) that is compiled and linked (e.g., to generate object code) to create an executable program. As noted above, source code may include the API and the code to implement the API. Updates to the source code may include patches, security updates, other updates, etc. A change in a specific part of the source code may effectuate a change in the API. The documentation 106 may include information pertaining to the source code changes which can be used to determine if a change to the API was intended. For example, the documentation 106 may indicate what changes are being made to the source code and whether those changes are expected to change the API. The documentation may be delivered to the API analysis server 104 with the updated source code 103. The use of a server to store the documentation 106 is only exemplary as the documentation 106 may be stored in any known manner that may be separate from the source code server 102.

In some exemplary embodiments, if documentation regarding the updated source code 103 exists, the API analysis server 104 is configured to scan the updated source code and determine if the documentation 106 indicates a change to the API. If the documentation does not indicate that there should be a change to the API but the API analysis server 104 determines that the updated source code 103 causes a change in the API, then in some exemplary embodiments, the API analysis server 104 may generate an alert to notify developers that an unintended change to the API has been detected. Conversely, if the documentation 106 indicates a change to the API should occur but the API analysis server 104 finds no such change, then the API analysis server 104 generates the alert to notify developers of the discrepancy. If, however, the API does or does not change as indicated in the documentation 106, then the API analysis server 104 may run existing tests on the API.

If, however, documentation 106 regarding the updated source code 103 does not exist, then in some exemplary embodiments, the API analysis server 104 may be configured to scan the updated source code 103 and scan one or more previous versions of the source code stored on the source code repository 108. The use of a server to store the previous versions of the source code is only exemplary as the previous versions of the source code may be stored in any known manner that may be separate from the API analysis server 104. Subsequently, the API analysis server 104 is configured to compare the API of the updated source code 103 with the API of the one or more previous source codes. If the comparison shows that the API has changed from the previous source code to the updated source code, then the API analysis server 104 may generate an alert to notify developers that an unintended change to the API has been detected. If, however, the API has not changed from the previous source code, then the API analysis server 104 may run existing tests on the API. In some embodiments, if any of those tests fail, the API analysis server 104 may generate an alert to notify developers that the existing tests need to be updated.

Figure 2:
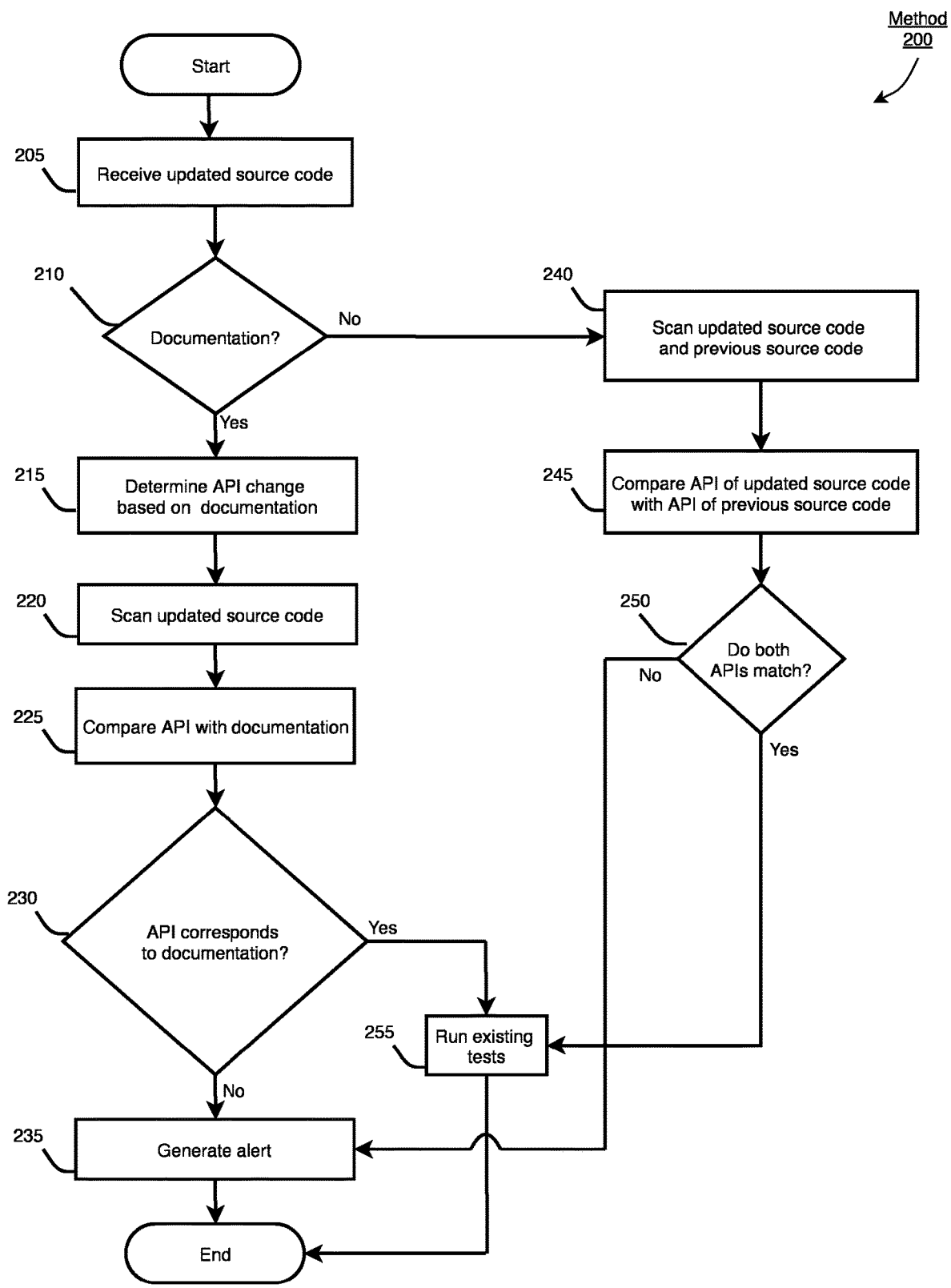
FIG. 2 shows an exemplary method for determining the existence of a change in an API according to the exemplary embodiments.

FIG. 2 shows an exemplary method 200 for determining the existence of a change in an API according to the exemplary embodiments. The method 200 may relate to the operations performed by the system 100 in scanning the updated source code 103 and comparing it with the documentation 106 and/or one or more previous versions of the source code to determine if an unintended change to the API has occurred. The method 200 will be described with regard to the system 100 of FIG. 1.

In 205, the API analysis server 104 receives the updated source code 103. In 210, the API analysis server 104 determines if documentation 106 corresponding to the updated source code 103 is also included. If documentation 106 exists, then, in 215 the API analysis server 104 determines if the API will change based on the information in the documentation 106. In 220, the API analysis server 104 scans the updated source code 103. In 225, the API analysis server 104 compares the API of the updated source code 103 with the documentation 106. If, in 230, the API analysis server 104 determines that the API of the updated source code 103 does not correspond to what is indicated in the documentation 106, then, in 235, the API analysis server 104 generates an alert to notify developers of the discrepancy. If, however, in 230, the API analysis server 104 determines that the API corresponds to what is indicated in the documentation 106, then, in 255, the API analysis server 104 may run existing tests on the API. In some embodiments, if any of those tests fail, the API analysis server 104 may generate an alert to notify developers that the tests need to be changed/updated.

If in 210, it is determined that documentation 106 regarding the updated source code 103 does not exist, then, in 240, the API analysis server 104 may scan the updated source code 103 and one or more previous versions of the source code stored in the source code repository 108. In 245, the API analysis server 104 may compare the API of the updated source code 103 with the API of the one or more previous versions of the source code. If, in 250, the API analysis server 104 determines that the API of the updated source code 103 has changed from the API of the one or more previous versions of the source code, then the API analysis server 104 proceeds to 235, where an alert is generated to notify developers of the discrepancy. If, however, in 250, the API analysis server 104 determines that the API of the updated source code 103 has not changed from the API of the one or more previous versions of the source code, then the API analysis server 104 proceeds to 255, where the API analysis server 104 runs existing tests on the API of the updated source code. In some embodiments, if any of those tests fail, the API analysis server 104 may generate an alert to notify developers that the tests need to be changed/updated.

Although FIG. 2 and the above description show the comparison of the API of the updated source code with the documentation 106 and the comparison of the API of the updated source code with the API of one or more previous versions of the source code as alternatives (parallel), in some embodiments, these may be performed in series. For example, the API analysis server 104 may scan the updated source code 103, scan one or more previous versions of the source code, and compare the API of the updated source code 103 with both the documentations 103 and the API of the one or more previous versions of the source code. The API analysis server 104 handles a change to the API similar to the functionality described above. In some embodiments, even if a change in the API of the updated source code 103 is found, the API analysis server 104 may still run the existing tests on the API to determine which portions of the API need to be addressed.

The exemplary embodiments provide a device, system, and method for determining whether a change in an API of a source code has occurred and whether that change, if any, was intended. With thousands (or more) packages, the mechanism according to the exemplary embodiments provides a means of automatically determining whether a change to the API, if any, is intended.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
    receiving updated source code for an application;
    receiving an application programming interface (API) corresponding to the application;
    scanning the updated source code;
    determining if the API has changed from a previous version of the API; and
    determining if a change in the API is an intended change based on a comparison of the API with a predetermined benchmark.

2. The method of claim 1, wherein the predetermined benchmark is documentation corresponding to the updated source code, and wherein the documentation indicates whether the API should change from the previous version of the API.

3. The method of claim 2, wherein, when the API has changed from the previous version of the API but the documentation indicates that the API should not have changed, the method further comprises:
    generating an alert to indicate that an unintended change in the API has occurred.

4. The method of claim 2, wherein, when the API has changed from the previous version of the API and the documentation indicates that the API should have changed, the method further comprises: executing tests on the API.

5. The method of claim 1, further comprising:
    scanning a previous version of the source code, wherein the previous version of the API corresponds to the previous version of the source code, and
    wherein the predetermined benchmark is the previous version of the API corresponding to the previous version of the source code.

6. The method of claim 5, wherein, when the API is different than the previous version of the API, the method further comprises:
    generating an alert to indicate that an unintended change in the API has occurred.

7. The method of claim 5, wherein, when the API is different than the previous version of the API, the method further comprises: executing tests on the API.

8. A system, comprising:
    A processor and memory;
    a source code server configured to compile an updated source code for an application, the application corresponding to an application programming interface (API); and
    an API analysis server configured to: receive the updated source code;
    receive the API;
    scan the updated source code;
    determine if the API has changed from a previous version of the API; and
    determine if a change in the API is an intended change based on a comparison of the API with a predetermined benchmark.

9. The system of claim 8, wherein the predetermined benchmark is documentation corresponding to the updated source code, and wherein the documentation indicates whether the API should have changed from the previous version of the API.

10. The system of claim 9, wherein, when the API has changed from the previous version of the API but the documentation indicates that the API should not have changed, the API analysis server is further configured to:
    generate an alert to indicate that an unintended change in the API has occurred.

11. The system of claim 9, wherein, when the API has changed from the previous version of the API but the documentation indicates that the API should not have changed, the API analysis server is further configured to: execute tests on the API.

12. The system of claim 8, wherein the API analysis server is further configured to:
    scan a previous version of the source code stored on an source code repository,
    wherein the predetermined benchmark is a previous version of the API corresponding to the previous source code.

13. The system of claim 12, wherein when API is different than the previous version of the API, the API analysis server is further configured to: generate an alert to indicate that an unintended change in the API has occurred.

14. The system of claim 12, wherein when API is different than the previous version of the API, the API analysis server is further configured to: execute tests on the API.

15. An analysis server comprising a processor and memory configured to perform operations comprising:
    receiving updated source code for an application;
    receiving an application programming interface (API) corresponding to the application;
    scanning the updated source code;
    determining if the API has changed from a previous version of the API; and
    determining if a change in the API is an intended change based on a comparison of the API with a predetermined benchmark.

16. The analysis server of claim 15, wherein the predetermined benchmark is documentation corresponding to the updated source code, and wherein the documentation indicates whether the API should change from the previous version of the API.

17. The analysis server of claim 16, wherein, when the API has changed from the previous version of the API but the documentation indicates that the API should not have changed, the operations further comprise:
   generating an alert to indicate that an unintended change in the API has occurred.

18. The analysis server of claim 16, wherein, when the API has changed from the previous version of the API and the documentation indicates that the API should have changed, the operations further comprise: executing tests on the API.

19. The analysis server of claim 15, wherein the operations further comprise:
   scanning a previous version of the source code, wherein the previous version of the API corresponds to the previous version of the source code, and
   wherein the predetermined benchmark is the previous version of the API corresponding to the previous version of the source code.

20. The analysis server of claim 19, wherein, when the API is different than the previous version of the API, the operations further comprise:
   generating an alert to indicate that an unintended change in the API has occurred.

\* \* \* \* \*